Figure 1:
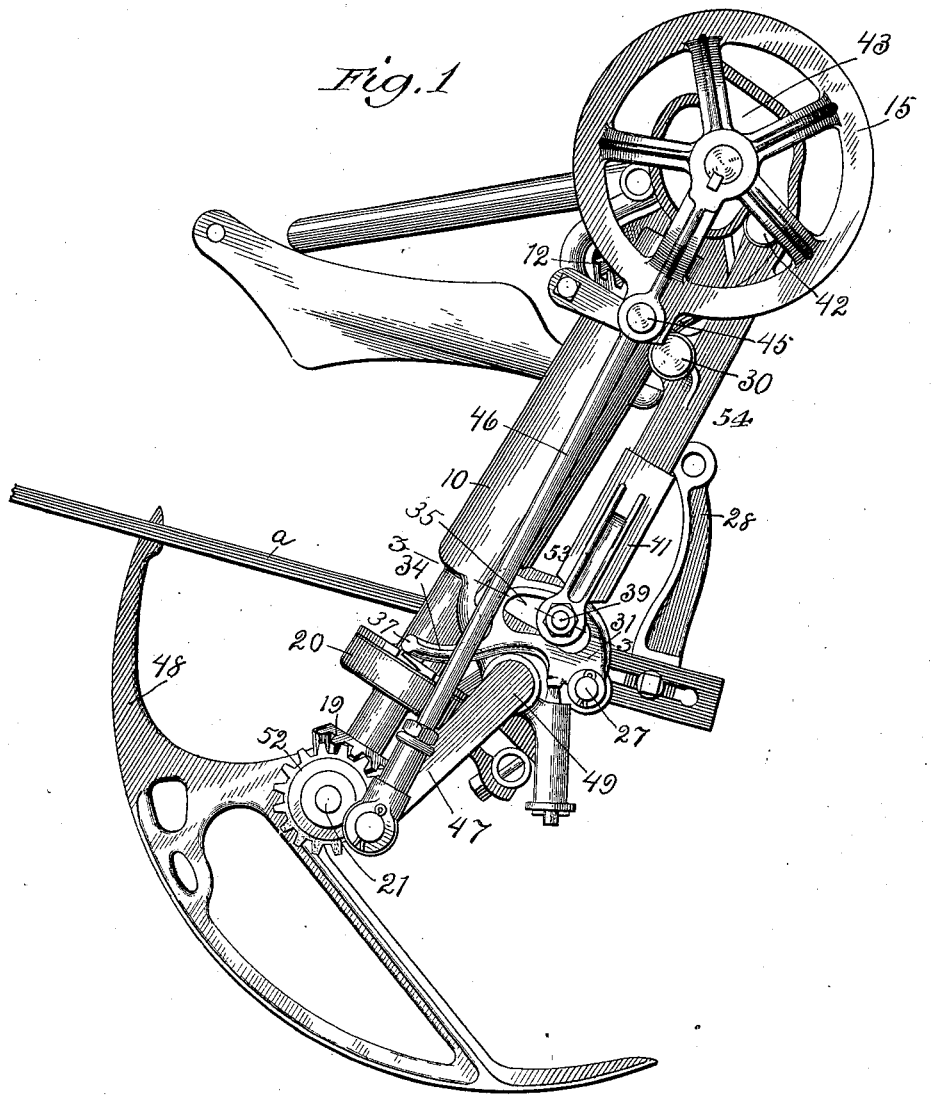

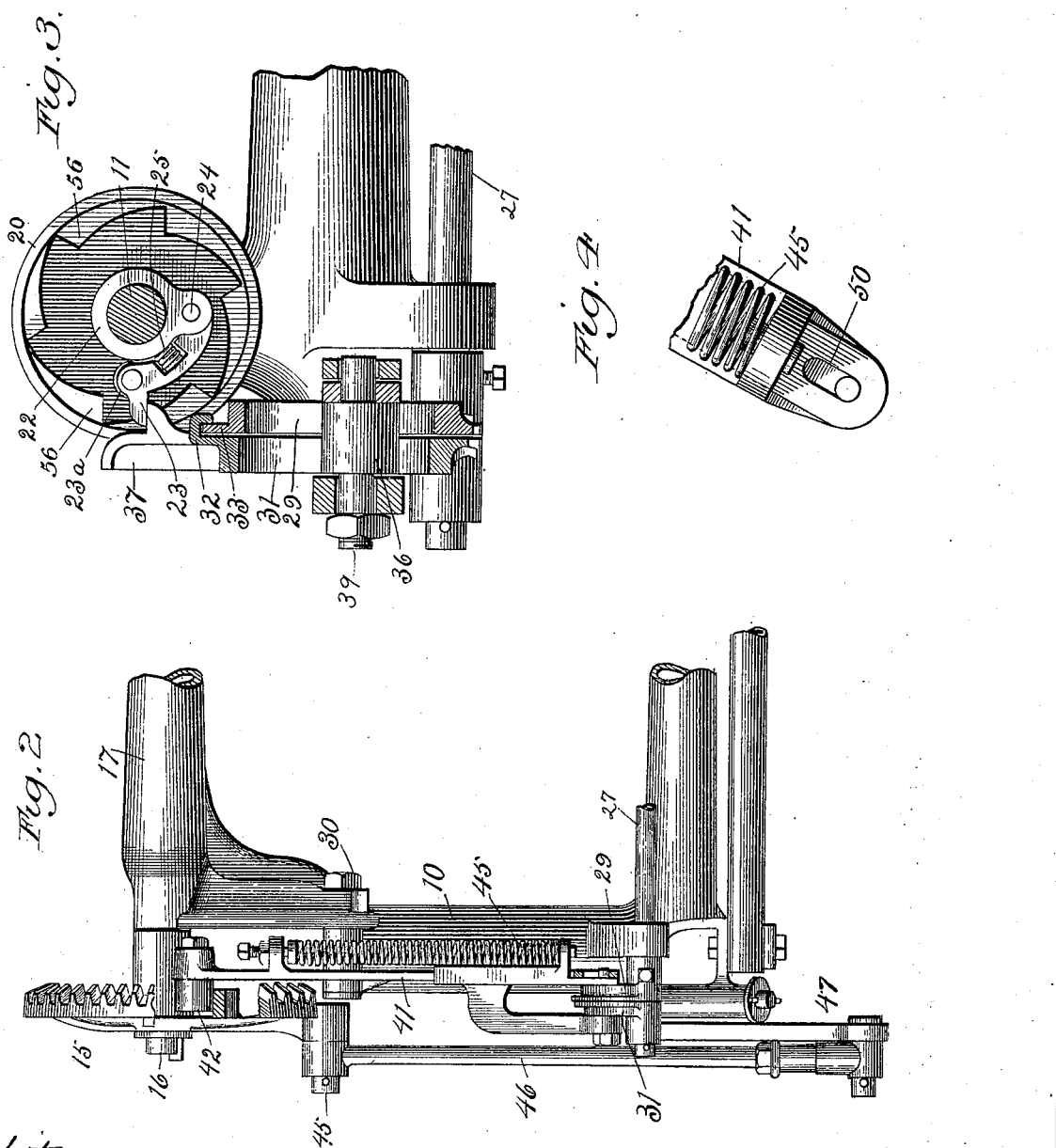

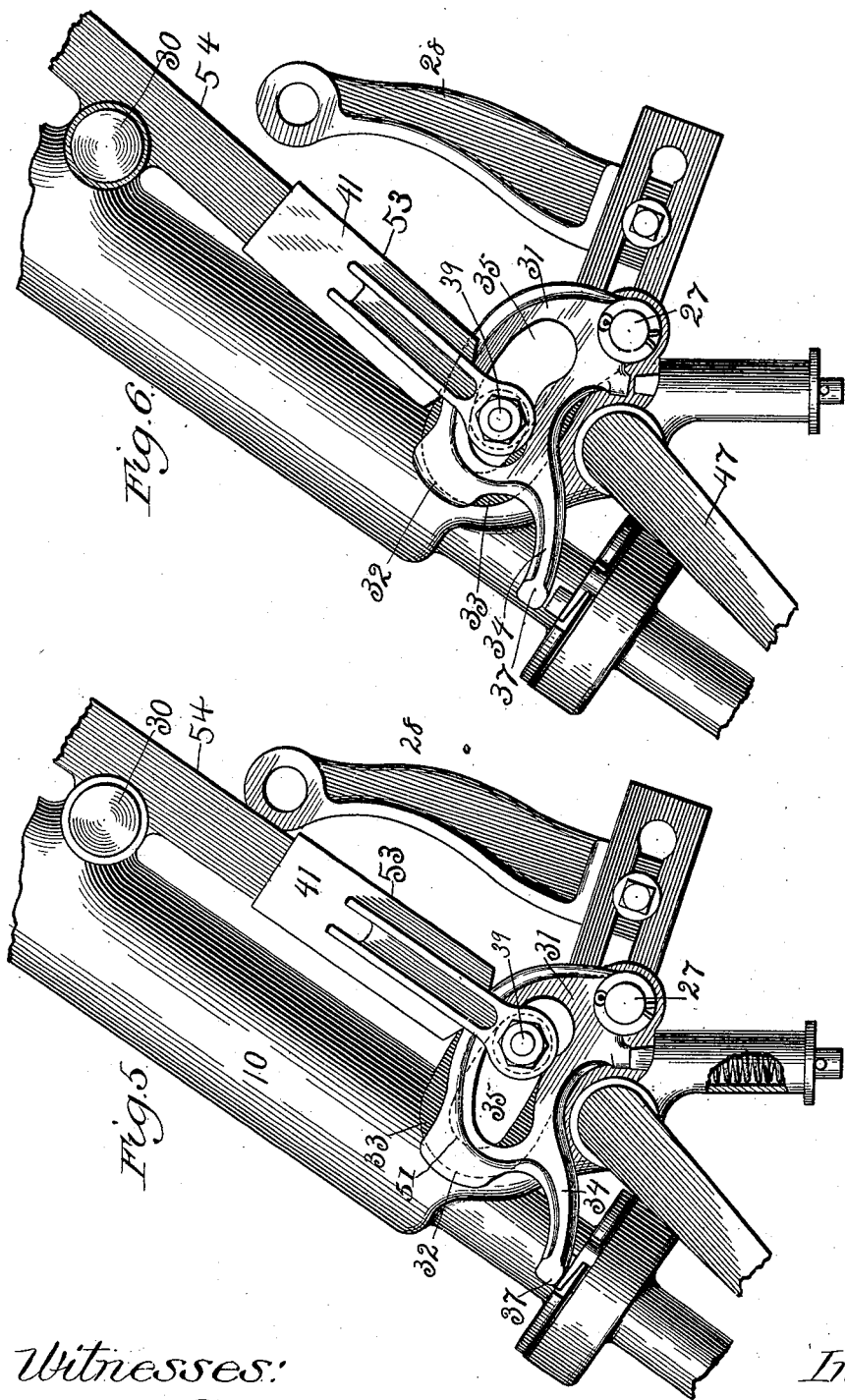

UNITED STATES PATENT OFFICE.

HENRY E. PRIDMORE, OF CHICAGO, ILLINOIS, ASSIGNOR TO THE McCORMICK HARVESTING MACHINE CO., OF CHICAGO, ILLINOIS, A CORPORATION OF ILLINOIS.

GRAIN-BINDER.

SPECIFICATION forming part of Letters Patent No. 687,263, dated November 26, 1901.

Application filed November 23, 1900. Serial No. 37,532. (No model.)

*To all whom it may concern:*

Be it known that I, HENRY E. PRIDMORE, a citizen of the United States, residing at Chicago, in the county of Cook and State of Illinois, have invented a new and useful Improvement in Grain-Binders, of which the following is a specification in its best form now known to me, reference being had to the accompanying drawings.

My invention relates to grain-binders, and particularly to an improvement in the trip for starting the binding mechanism shown and described in my United States Patent No. 601,609, issued March 29, 1898.

My invention consists in an improvement in the mechanism of the machine by which after the tripping is done and the binder started the pressure-arm is maintained in the desired position or positions throughout the binding operation, whereby the knotting mechanism is relieved from unnecessary strain, so that it can operate more easily and smoothly than in the construction heretofore used.

It also consists in the details of construction hereinafter more fully described and claimed.

In the drawings, Figure 1 is an end elevation of the gear end of the binding mechanism of my grain-binder, the deck upon which the grain is received from the harvester being indicated by *a*. Fig. 2 is a side view of the mechanism, shown in Fig. 1. Fig. 3 is a detail sectional plan view of the links and clutch mechanism, taken on line 3 of Fig. 1. Fig. 4 is a detail of the spring-link. Figs. 5 and 6 are detail views of the trip mechanism, showing the positions of the parts when the spring-link is in different positions.

In the upright member 10 of the usual ⊏-shaped binder-frame is journaled a shaft 11, having rigidly secured to its upper end the bevel-pinion 12, meshing into the teeth of the wheel 15, journaled at 16 in the upper frame 17. Loosely mounted on the lower end of shaft 11 is the bevel-pinion 19, meshing into the pinion 52 on the shaft 21, which supplies the power to the mechanism here in question. Rigidly attached to the pinion 19 is the hub or flange 20, having its inner surface notched, so as to form the teeth 56, as shown in Fig. 3.

Rigidly secured to the shaft 11 is the hub 22, to which the trip-dog 23 is pivoted at 24. This dog is normally forced outward by the spring 25, Fig. 3, so that the lower part 23ᵃ is pressed into the path of the notches 56, thereby locking the shaft 11 to the pinion 19 and imparting motion to the binding-arm. This mechanism will be hereinafter referred to as a "clutch."

Rigidly mounted on the shaft 27, extending across the machine, is the trip and compressor-finger 28, which extends up substantially vertical to the flow of grain over the platform *a*. Keyed to this shaft 27 is an arm forming the inner half 29 of the improved trip-stop. In this stop is a slot 51, (shown in dotted lines, Figs. 5 and 6, illustrating one form of my invention,) having the center of the curves of its parallel edges either in the stud 30, where the spring-link 41, to be hereinafter described, is pivoted to the frame 10, or so otherwise located that the end of the spring-link can be moved backward and forward in said slot without moving the presser-arm 28 to any material extent. Loosely mounted on the shaft 27 is the outer half 31 of the trip-stop. The flange 32 bends around and incloses the flange 33 of the inner half 29 of the stop, there being sufficient clearance to permit of the halves moving independently without interfering with each other. This outer half of the trip has extending from it the arm 34, adapted to engage the stop 23, heretofore described. In this outer half 31 of the compound trip is the curved slot 35, having the end which is nearest shaft 27 so related to the various parts that when the roller 36 is in this end of the trip-stop the arm 34 will be in its lowest position and its end 37 will be in engagement with the stop 23, whereby said stop will be held out of engagement with the teeth 21 or the clutch will be in release position. The remainder of the slot is so shaped that when the roller 36, journaled on the bolt 39 in the end of the spring-link 41, pivoted at 30, is swung away from shaft 27 the end 37 of arm 34 will be lifted out of engagement with the dog 23 and the clutch will connect shaft 11 with driving-shaft 21.

Pivoted to the stud 30, heretofore described, is the spring-link 41, having at its lower end the roller 36, adapted to move back and forth in the different-shaped slots of the two parts of trip-stop heretofore described, and at its upper end is the roller 42, adapted to travel in the cam-track 43 on the inside of wheel 15. This spring-link 41, as illustrated, is composed of a bar 54, pivoted at 30, carrying in its upper end the roller 42, and of the sliding bar 53, sleeved upon the lower end of the pivoted bar and carrying the roller 36. These two bars are normally pressed apart by the spring 45, as shown in Figs. 2 and 3. This cam-track is so shaped that when the binding mechanism is at rest the roller 36 is in the end of the slots in the trip-stops nearest to the shaft 27. When the trip is operated by the pressure of grain on the compressor-finger 28, it moves to the position shown in Fig. 6, where the spring 45, acting at a greater leverage, resists the binding-pressure against the compressor-finger 28. When the binding is completed, the spring-link, Fig. 1, is rocked in the reverse direction away from support 10 and thrown farther away from it than shown in any figure of these drawings, as fully illustrated in my former patent. By this motion the presser-bar 28 is thrown over until it is below the plane of the table $a$ and the bundle of bound grain falls out of the binding mechanism. Then the spring-link is swung back to its original position. In some binders the trip-finger is drawn against the binder to relieve the cord, and thus furnish slack for the loop in the knot. Manifestly if this motion is desired it is only necessary to change the shape of the slot to permit the desired motion; but the same independence of motion and control is obtained by the use of my invention as where the compressor-arm remains stationary, as heretofore described.

Pivoted to the stud 45 on the wheel 15 is the connecting-rod 46, operating through crank-arm 47, the needle 48 of the knotting mechanism which rocks back and forth with shaft 49 as wheel 15 rotates.

In the end of spring-link 41 is the slot 50, (see Fig. 4,) in which the end of roller 36 is adapted to move up and down.

In the operation of the machine the mechanism is normally in the position shown in Figs. 1 and 5. The grain is delivered by the elevators upon the deck $a$ and by mechanism (not shown) is carried downward against the compressor-finger 28 until the amount necessary for a bundle is received, when by the increasing size of the gavel the pressure becomes so great that the trip yields and is moved about the axis 27 and the roller 36 is moved upward against the action of spring 45. This roller is moved by the inner half 29 of the trip-stop, which is rigidly secured to shaft 27 and carries with it the outer half 31, which, as heretofore described, is loose upon the shaft. This motion continues until the end 37 of arm 34 is lifted out of engagement with catch 23, so that the pinion 19 is locked to shaft 11, as heretofore described, and shaft 11 begins to rotate, thereby rotating wheel 15 and cam-track 43. As this wheel and cam rotate spring-link 41 is moved over in the slots in the trip-stop to the position shown in Fig. 6. As the slot in the inner half 29 of the trip-stop has its centers located as above described, the compressor-arm 28 remains in a stationary position throughout this motion of the roller 36, and in this consists one of the principal features of my improvement, for where there is only the one slot, (shaped necessarily like 35,) as in the machine shown in my former patent, above referred to, the passage of the roller 36 from one end of the slot to the other gives compressor-finger 28, which is bearing against the bundle of grain, a rocking motion, which this invention avoids, thereby relieving the knotting mechanism and twine of strain and friction and increasing precision. As roller 36 moves over in the two slots the arm 34 is kept (because of the curved shape of slot 35 in the front half of the trip-stop) in such a position that it remains clear of the dog 23. The spring-link remains in the position shown in Fig. 6 until the knotting is completed, when the bundle is ejected and the mechanism restored to the original position, as heretofore described.

Having thus described my invention, what I claim as new, and desire to secure by Letters Patent, is—

1. In a grain-binder, the combination of a trip or compressor-finger and its rock-shaft, an arm rigidly secured to said rock-shaft, an extensible lever pivoted to the binder-frame and having a bearing in an elongated slot in said arm, and the elongated slot shaped as described to permit the lever to oscillate therein without materially disturbing the position of the compressor-finger or changing the length of the lever.

2. In a grain-binder, in combination, a trip or compressor-finger and its rock-shaft, an arm rigidly secured to said rock-shaft, an extensible lever pivoted to the binder-frame, one end of the lever entering the path of a cam on the knotter-shaft and the other end bearing in an elongated slot, in the arm on the rock-shaft the cam on the knotter-shaft and the elongated slot so shaped that the end of the lever can be moved back and forth therein without materially disturbing the position of the compressor-finger or changing the length of the lever.

3. In a grain-binder, the combination of a trip or compressor-finger and its rock-shaft, an arm rigidly secured to said rock-shaft, an elongated slot therein, a power-clutch, another arm loosely mounted on said rock-shaft having a member controlling said power-clutch, an elongated slot therein, a lever-arm pivoted to the frame of the machine having one end entering the slots in both of said first-mentioned arms, the slot in the former being so shaped that the lever-arm may be moved back and forth in the slot without disturbing the position of the compressor-finger, and the shape of the slot in the latter arm being such that as the lever is moved along in the slot the member is held out of engagement with the clutch.

4. In a grain-binder, the combination of a trip or compressor-finger and its rock-shaft, an arm rigidly secured to said rock-shaft, an elongated slot therein, a power-clutch, another arm loosely mounted on said rock-shaft and having a member controlling the power-clutch, an elongated slot in said arm, a lever-arm pivoted to the frame of the machine having one end entering slots in both of said first-mentioned arms, the slot in the former being so shaped that the lever-arm may be moved back and forth in the slot without disturbing the position of the compressor-finger, and the shape of the slot in the latter arm being such that as the lever is moved along in the slot the member is held out of engagement with the clutch, all of the parts being arranged and disposed substantially as shown and described.

5. In a grain-binder, the combination of the compressor-finger, the rock-shaft carrying said finger, a compound trip composed of an arm rigidly secured to said rock-shaft, and an arm pivotally connected thereto, said arms being differentially slotted, and an extensible lever pivoted to the binder-frame and having a bearing in the slots of said arms, substantially as and for the purposes described.

6. In a grain-binder in combination with the compressor-finger and its rock-shaft, the compound trip composed of a fixed and a pivoted arm mounted on said rock-shaft with differentiated slots in said arms and another arm pivoted to the machine having a member entering said differentiated slots adapted to control said compound trip.

7. In a grain-binder in combination with the compressor-finger and its rock-shaft, the compound trip composed of a fixed and a pivoted arm mounted on said rock-shaft with differentiated slots in said arms, another arm pivoted to the machine having a member entering said differentiated slots adapted to control said compound trip and having another member entering the path of a cam on the knotter-shaft.

HENRY E. PRIDMORE.

Witnesses:
W. P. BURKE,
R. B. SWIFT.